2 Sheets—Sheet 1.

D. J. POWERS,

Assignor to the UNION WIRE MATTRESS COMPANY.

FOLDING BED.

No. 10,606. Reissued June 2, 1885.

Witnesses
W. C. Collier
A. M. Best

Inventor
David J. Powers
By Coburn & Thacher
Attorneys

N. PETERS, Photo-Lithographer, Washington, D. C.

2 Sheets—Sheet 2.
D. J. POWERS,
Assignor to the UNION WIRE MATTRESS COMPANY.
FOLDING BED.
No. 10,606. Reissued June 2, 1885.
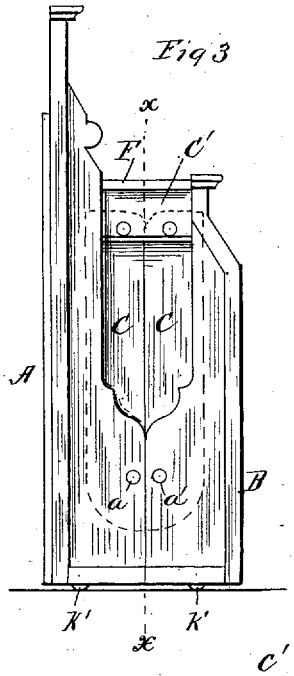
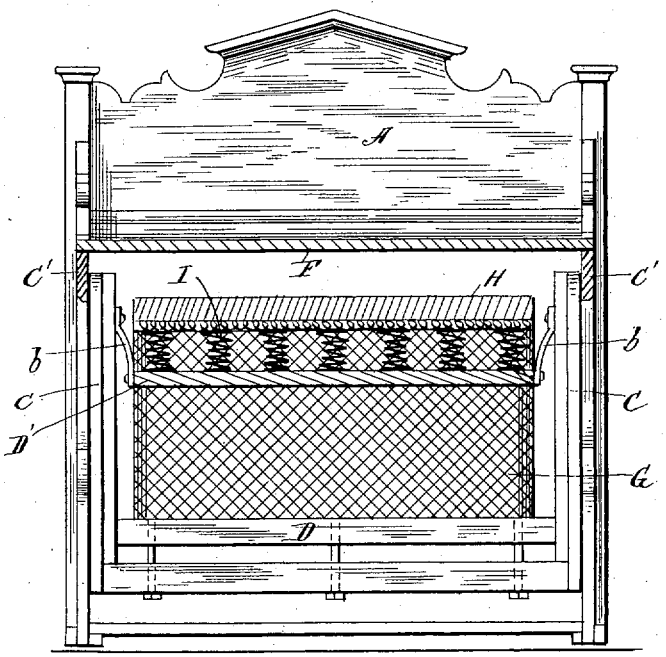
Fig 4
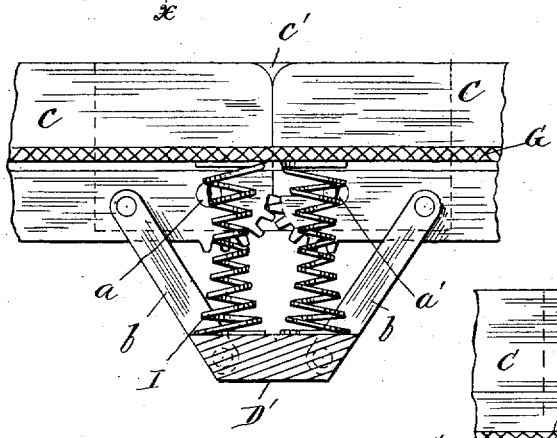
Fig 5
Fig 6
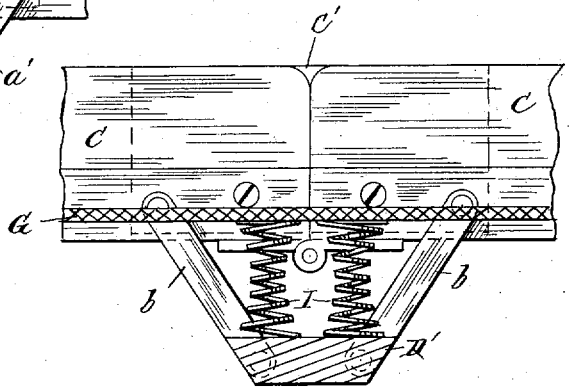
Witnesses
H. C. Corlies
A. M. Best
Inventor
David J. Powers
By Cadwalader & Washburn
Attorneys
N. PETERS, Photo-Lithographer, Washington, D. C.

UNITED STATES PATENT OFFICE.

DAVID J. POWERS, OF CHICAGO, ILLINOIS, ASSIGNOR TO THE UNION WIRE MATTRESS COMPANY, OF SAME PLACE.

FOLDING BED.

SPECIFICATION forming part of Reissued Letters Patent No. 10,606, dated June 2, 1885.

Original No. 276,464, dated April 24, 1883. Application for reissue filed December 14, 1883.

*To all whom it may concern:*

Be it known that I, DAVID J. POWERS, a citizen of the United States, and residing at Chicago, in the county of Cook and State of Illinois, have invented certain new and useful Improvements in Folding Beds, which are fully set forth in the following specification, reference being had to the accompanying drawings.

My invention relates to improvements in folding beds; and it consists, first, in an adaptation to the head and foot ends of the bed of connecting side rails that fold upward from their middle, and an elastic metallic fabric arranged and operating as hereinafter described; second, in such a combination of side rails, cross-rails, and fabric arranged to open and close easily, as described; third, in a peculiarly-applied side rail and top rail for the case; fourth, in an automatic head-board; fifth, in an adaptation of a central cross-rail so as to afford increased room for the bedding when the same is folded; sixth, in the special construction and arrangement of the caster-supports for the end sections; seventh, in the construction of the end sections and side rails so as to close the ends of the case when the bed is folded; eighth, in constructing and arranging the cross-rails so as to take up and support the bedding when the bed is closed; ninth, in the construction and arrangement of the end sections, side rails, and clasp-rails, so as to present a complete finish when the bed is folded.

Figure 1:
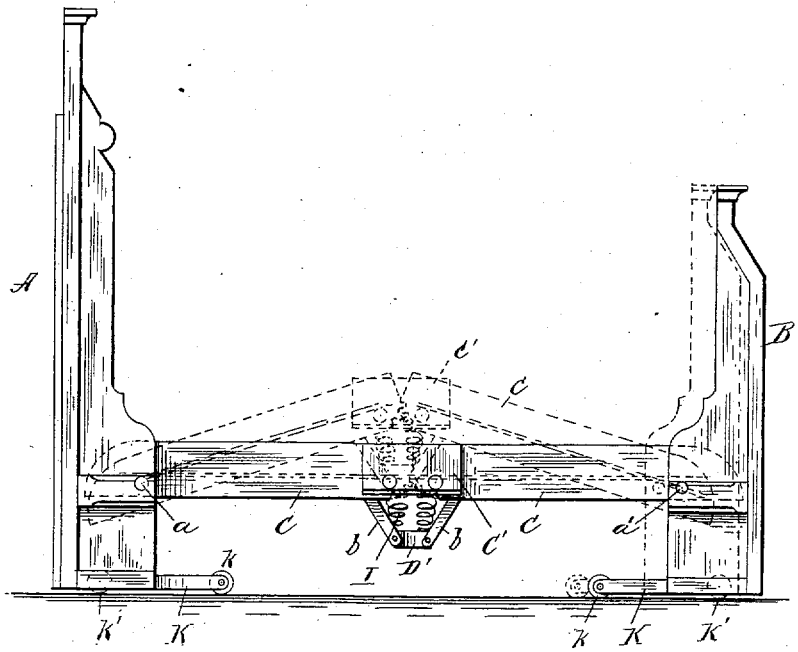
Figure 2:
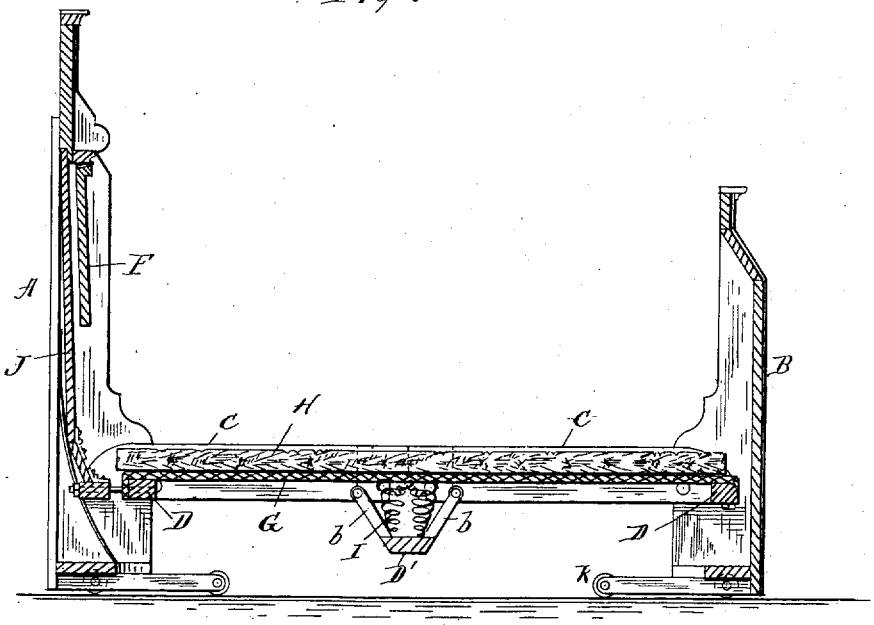

Figure 1 of the drawings is a side view of my bed when unfolded, ready for use, with dotted lines showing the position of the fabric and bedding under certain conditions, also of the side rails. Fig. 2 is a longitudinal central section of same. Fig. 3 shows the bed closed. Fig. 4 is a transverse sectional view on line *x x* of Fig. 3. Fig. 5 is a section showing the clamp and side rail joint. Fig. 6 is a section showing the manner of attaching rail D′ to the side rails, also a modification of the rail-joint.

A is the head end of the bed, and B is the foot end, made as shown or in any form desired. These end sections of the bed are made separate and independent of each other.

C C are the side rails, pivoted at *a a′* to the head and foot ends, said side rails being divided and hinged at or near their middle, so that they will fold upward from their middle, rule-fashion, edgewise, but not downward materially below a horizontal, said rails and ends being so adapted to each other that they will entirely inclose the sides of the case when the bed is folded. This result is effected by leaving the upper part or narrow portion of the sides of the end pieces of such width that when the bed is folded the side rails will overlap or pass inside of them at their edges, as shown in dotted lines in Fig. 3 of the drawings.

To the side rails, at their outer ends, are secured cross-rails D D, to which are attached the opposite ends of an elastic metallic fabric of woven-wire coils G, or of other equivalent character. This fabric is of a proper length to secure the right tension for a bed-bottom when the side rails are fully extended. The fabric must be attached very nearly in line with the hinges of the rails, but a little above them, so as to give the utmost purchase to the elbow-joint of the rails for stretching the fabric suitably for use, and also so as to more easily admit of the unlocking of the rails upward when the bed is to be folded.

A center cross-rail, D′, is secured to the side rails at the joint and underneath the fabric by means of four pivoted clips, *b b b b*, one being attached to each section of the side rails at such a distance back from the hinges as to cause the rail D′, to which the other ends of the clips are attached, (two to each end,) to occupy a different relative position when the bed is unfolded, and vice versa when folded. Upon the cross-rail D′ may be secured a series of elastic coil or other springs, I, so placed as to support the fabric when the bed is unfolded, as shown in Fig. 1. The object of thus pivoting rail D′ to the side rails back from the hinges is to cause it to drop lower down when the bed is folded together with the fabric, so as to leave more space near the top of the case for the bedding between the fabric and cover F, which is hinged to the head end of the case near its top, and adapted to fully cover and close up the top of the bed-case when folded, and to swing down out of the way when the bed is unfolded.

An important function of rail D′ is the supporting of the metallic fabric and bedding above the horizontal line of the side-rail attachment to the ends, as shown by dotted lines in Fig. 1, and thus contributing their weight to aid in closing down the side rails and stretching the fabric sufficiently tight for a bed-bottom. Without this supporting cross-rail the fabric and bedding when slackened would fall to the point below the horizontal, the reverse of what is indicated by the dotted lines in Fig. 1, and thus require to be lifted to a straight line when closing down the side rails, and, instead of aiding, materially hindering the said closing, and this difference of helping or hindering is found sufficient to render the one means a success and the other a failure in practice, for the reason that such beds are usually handled by women, who, as a rule, are not very strong; but with the elevated fabric and bedding H to help, a woman can close down the rails and extend the fabric with ease, while without rail D′, and with the fabric and bedding hanging below, an ordinary stout man can hardly do it. This cross-rail also supports the metallic fabric and bedding centrally as the bed is folded up, taking it up and preventing all sagging or falling down during the folding up and together of the side pieces. Thus with rail D′ as applied the bed is practical, and without it it is not. The stretching of the fabric is also largely aided by the firm support of the hinged rails at both ends, as shown in my bed, as compared with bed structures which fold outward from the wall upon a single head-support and have the bedding and fabric not only to stretch, but to lift up first to the stretching-line.

My double end support for the side rails and central elevated support for the fabric and bedding when about to be stretched are of vital importance in a bed in which the fabric is to be stretched as often as used, and withal needs to be sufficiently stretched to make a good bottom for a bed.

The clasp-rails C′ are of about the same width as the side rails, and the right length to fill the space between the upright standards of the head and foot ends of the closed bed against which they abut, thus making a proper top rail and complete finish like a panel for the ends of the case when the bed is folded, as shown in Fig. 3 of the drawings, and a supporting-clasp and cover for the joints of the side rails when the bed is unfolded. They may be wrought in any style preferred. They are secured in position parallel to the rails unfolded, one screw in each section of the rail at an equal distance from the joint, the attachment being so adapted as to cause the clasp-rail to at all times preserve a horizontal position. Fig. 6 shows a modification of rail-hinge.

In the back of the head end of the bed from about the middle upward I have an opening for ventilation when the case is closed; and to this opening I adapt a head-board, J, to slide automatically in grooves or otherwise, and connected at its ends with the outer ends of the side or end rails, so that when the rails are folded and the bed closed the head-board is withdrawn from the opening, so as to leave free ventilation, and so that when the bed is opened and extended for use the head-board closes the opening, and thus makes a continuous wall to the head of the bed, the advantages of which are obvious.

As the side rails are hinged to the head and foot ends of the bed some distance above their bases, it is obvious that when the bed is folded the pull will tend to tip these ends inward. In order to effectually prevent this tipping I attach arms or bars K to the bases of the end sections and extend them inward horizontally some distance beyond the bases to which they are attached, as shown in Figs. 1 and 2 of the drawings. Caster-wheels *k* are mounted in the outer ends of these respective supports, and similar wheels, *k′*, in either their inner ends, or some other suitable support underneath the end sections. Obviously this extension of the caster-supports some distance inward beyond the bases of the end sections will act to prevent any tipping of the latter when the bed is being folded. The particular construction and arrangement of these caster-supports are immaterial so long as the supports are carried beyond the bases of the end sections sufficiently far to give the required leverage. The bars mentioned above and shown in the drawings are arranged so as to pass by each other and underneath the bases of the respective sections as the latter are closed together.

I am aware of Letters Patent No. 80,208, granted to Parker, July 21, 1868, and English Patent No. 3,325 of 1882; and I hereby disclaim any structure constructed and operating as shown and described in either of the said Letters Patent.

Having thus fully described my invention, what I claim as new, and desire to secure by Letters Patent, is as follows:

1. In a folding bed, independent upright head and foot sections, which are horizontally movable and constructed to form an inclosing-case when brought together, in combination with side rails hinged at their respective ends to the head and foot sections and jointed about midway of their length by a hinge, which permits them to fold upward, and an elastic bed-bottom or fabric attached at its respective ends to and suspended between supports connected to the head and foot sections, respectively, all constructed and arranged relatively to produce a strain upon the fabric when the sections are separated and the side rails brought into horizontal position, but to release said strain when the side rails are folded up and the sections moved toward each other, substantially as and for the purposes set forth.

2. In a folding bed, independent upright head and foot sections, which are horizontally movable and constructed to form an inclosing-case when brought together, in combination with side rails hinged at their respective ends to the head and foot sections, and jointed about midway of their length by a hinge, which permits them to fold upward, and an elastic bed-bottom or fabric attached at its respective ends to and suspended between supports connected to the head and foot sections, respectively, and a cross-rail arranged underneath the bed-bottom and connected to the respective side rails near their middle joint, substantially as and for the purposes set forth.

3. In a folding bed, the jointed side rails constructed to fold upward about midway of their length, in combination with a cross-rail arranged underneath the bed-bottom and connected to the side rails near their middle joints by clips pivoted to the respective sections of the side rails, substantially as and for the purposes set forth.

4. In a folding bed, independent upright head and foot sections, which are movable, in combination with jointed side rails and caster-supports attached to the respective sections and projecting inward some distance beyond the bases of said sections, substantially as and for the purposes set forth.

5. In a folding bed, independent upright head and foot sections, which are movable, and which, when closed together, form the main body of the case for the other parts of the bed, in combination with jointed side rails hinged to the respective sections and of a width to fully close the openings between the head and foot sections when the bed is folded up and said sections are brought together, substantially as and for the purposes set forth.

6. In a folding bed, the independent upright movable head and foot sections A and B, which, when closed together, form the main body of the case for the other parts of the bed, in combination with the jointed side rails, C C, hinged to the respective sections, and the hinged clasp-rails C′ C′, all constructed and arranged substantially as and for the purposes set forth.

7. In a folding bed, independent upright head and foot sections, which are movable, and which, when closed together, form the body of a case for the other parts of the bed, in combination with folding side rails hinged at their ends to the respective sections, and an elastic bed-bottom or fabric fastened at its respective ends to supports connected to the said respective sections, substantially as and for the purposes set forth.

DAVID J. POWERS.

Witnesses:
W. C. CORLIES,
A. M. BEST.